(12) United States Patent
Ruck et al.

(10) Patent No.: US 9,964,391 B2
(45) Date of Patent: May 8, 2018

(54) METHOD FOR AUTOMATICALLY RECEIVING A SENSOR HEAD AND COORDINATE MEASURING MACHINE

(71) Applicant: Carl Zeiss Industrielle Messtechnik GmbH, Oberkochen (DE)

(72) Inventors: Otto Ruck, Pfahlheim (DE); Peter Mueller, Oberndorf (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 138 days.

(21) Appl. No.: 14/950,533

(22) Filed: Nov. 24, 2015

(65) Prior Publication Data
US 2016/0076867 A1 Mar. 17, 2016

Related U.S. Application Data

(63) Continuation of application No. PCT/EP2014/060470, filed on May 21, 2014.

(30) Foreign Application Priority Data

Jun. 4, 2013 (DE) ........................ 10 2013 105 753

(51) Int. Cl.
*G01B 5/004* (2006.01)
*G01B 5/008* (2006.01)
*G01B 21/04* (2006.01)

(52) U.S. Cl.
CPC ............ *G01B 5/008* (2013.01); *G01B 21/047* (2013.01)

(58) Field of Classification Search
CPC ...... G01B 21/047; G01B 5/004; G01B 5/008; G01B 5/012; G01B 5/016; G01B 21/04
(Continued)

(56) References Cited

U.S. PATENT DOCUMENTS 4,510,693 A 4/1985 Cusack
4,963,728 A * 10/1990 Hof ..................... G01B 11/007
250/227.11
(Continued)

FOREIGN PATENT DOCUMENTS

CN 1646931 A 7/2005
CN 101153790 A 4/2008
(Continued)

OTHER PUBLICATIONS

International Search Report for PCT/EP2014/060470; dated Aug. 28, 2014; 3 pp.
(Continued)

*Primary Examiner* — Benjamin Schmitt
(74) *Attorney, Agent, or Firm* — Harness, Dickey & Pierce, P.L.C.

(57) ABSTRACT

A method for automatically receiving a sensor head of a coordinate measuring machine. The sensor head comprises a first changing interface for coupling the sensor head with a carrier structure of the coordinate measuring machine, and a second changing interface for coupling a cable element with the carrier structure. The second changing interface of the sensor head is arranged on an end of the cable element distal to the sensor head, and is spatially separated from the first changing interface. The sensor head is initially provided in a magazine location of the coordinate measuring machine. The sensor head is received with the first changing interface in a first receiver of the magazine location, and the second changing interface is received in a second receiver of the magazine location.

9 Claims, 10 Drawing Sheets

(58) Field of Classification Search
USPC .............................. 33/503; 702/94, 95, 150
See application file for complete search history.

(56) References Cited

U.S. PATENT DOCUMENTS

| | | | |
|---|---|---|---|
| 5,418,730 | A | 5/1995 | Mariani et al. |
| 6,756,800 | B2 | 6/2004 | Chiu et al. |
| 7,051,447 | B2 | 5/2006 | Kikuchi et al. |
| 8,535,208 | B2 | 9/2013 | Jordil et al. |
| 2003/0177653 | A1 | 9/2003 | Granger |
| 2009/0109285 | A1 | 4/2009 | Tobiason et al. |
| 2010/0122920 | A1* | 5/2010 | Butter ............... B23Q 3/15526 206/223 |

FOREIGN PATENT DOCUMENTS

| | | |
|---|---|---|
| CN | 101675318 A | 3/2010 |
| CN | 101688766 A | 3/2010 |
| DE | 3823373 A1 | 1/1990 |
| DE | 20 2005 000 983 U1 | 4/2005 |
| DE | 10 2010 050 544 A1 | 5/2012 |
| EP | 1 930 687 A1 | 6/2008 |
| EP | 2 096 403 A1 | 9/2009 |
| WO | 2008/132484 A1 | 11/2008 |
| WO | 2009/062641 A1 | 5/2009 |

OTHER PUBLICATIONS

English language translation of International Preliminary Report on Patentability (Chapter I) for PCT/EP2014/060470; dated Dec. 8, 2015; 10 pp.
English language translation of German Office Action for DE 10 2013 105 753.5; dated Dec. 13, 2013; 5 pp.
Chinese Search Report (English translation provided) for Appl'n No. 2014800410714; dated Oct. 9, 2017; 21 pp.
European Examination Report (English translation provided) for Appl'n No. 14727444.3; dated Sep. 6, 2017; 8 pp.

* cited by examiner

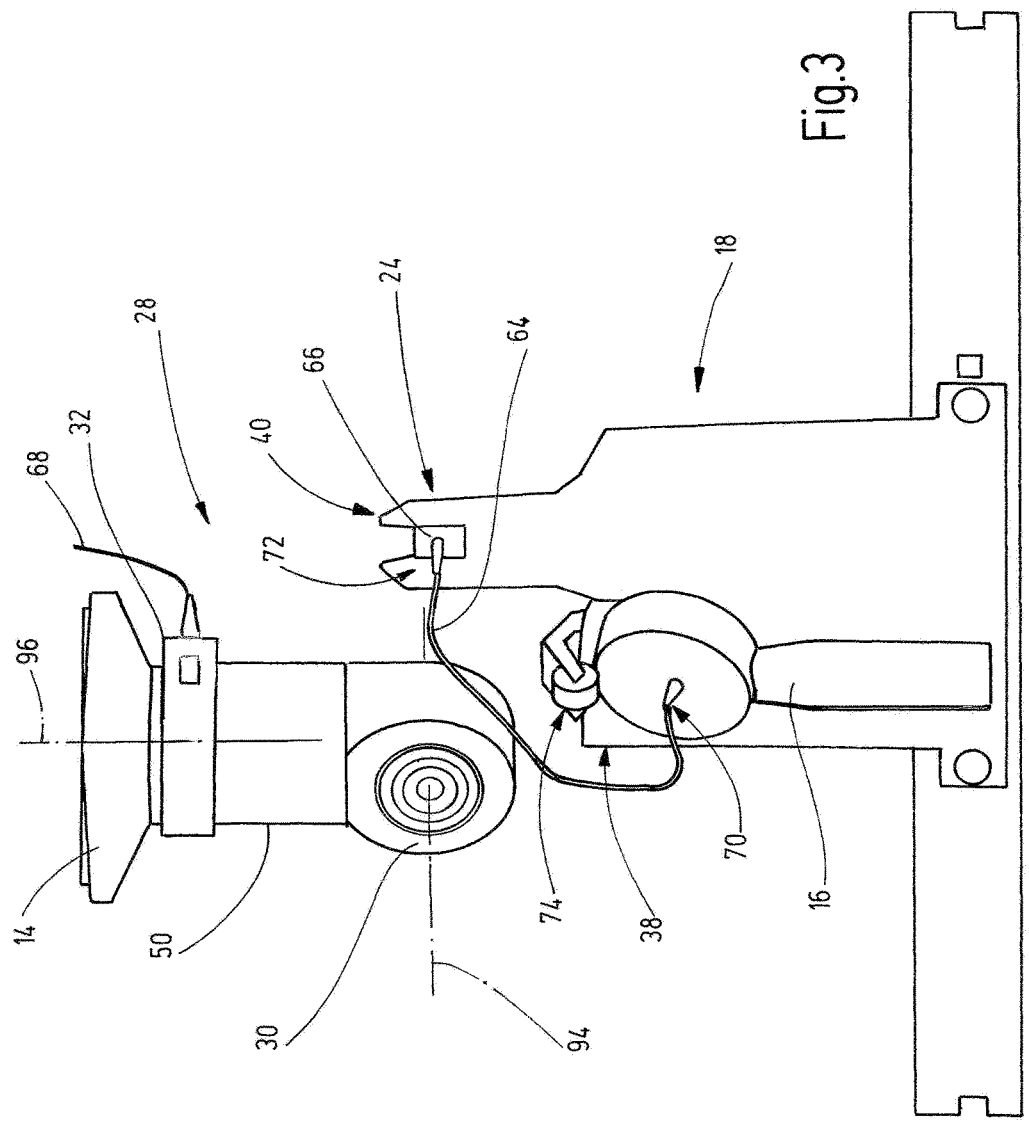

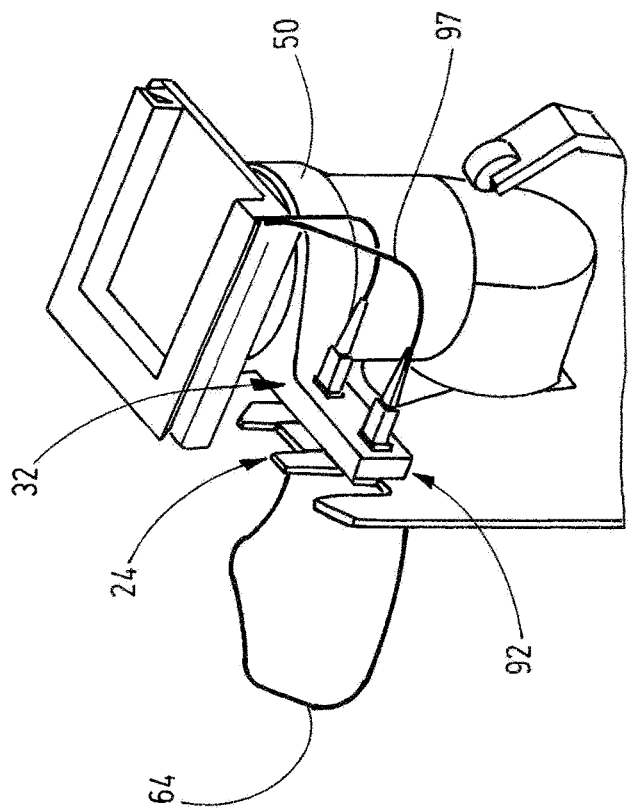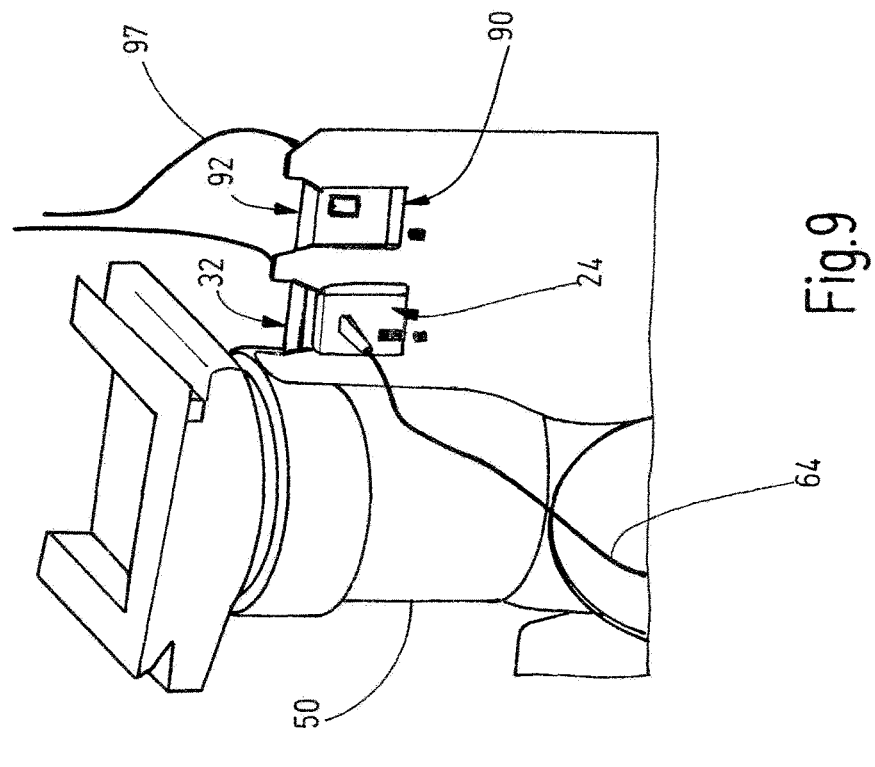
Fig.9

METHOD FOR AUTOMATICALLY RECEIVING A SENSOR HEAD AND COORDINATE MEASURING MACHINE

CROSS-REFERENCE TO RELATED APPLICATIONS

This is a Continuation application of International patent application PCT/EP2014/060470, filed May 21, 2014, which claims the priority of German patent application DE 10 2013 105 753.5, filed Jun. 4, 2013. The entire contents of these priority applications are incorporated herein by reference.

BACKGROUND OF THE INVENTION

The present invention relates to a method for automatically receiving a sensor head of a coordinate measuring machine, wherein the sensor head comprises a first changing interface for coupling the sensor head with a carrier structure of the coordinate measuring machine. In addition, the present invention relates to a corresponding carrier structure element and to a corresponding sensor head. Finally, the present invention relates to a magazine location and to a coordinate measuring machine.

Methods for changing sensor heads in coordinate measuring machines and corresponding devices are known, for example, from document WO 2008/132484 A1.

Different techniques for changing sensor heads and coordinate measuring machines are known.

Changing interfaces for automatically changing sensors or carrier systems are widely spread, such as, for example, on Zeiss® turn-swivel joints such as, for instance, the models marketed under the designations RTS, DSE or CSC by the applicant. This is also known in the case of measuring carrier systems such as, for example, Zeiss® VAST, VAST XT etc., here as a rule only a disk with a passive stylus being exchanged. As a rule, such a changing interface consists of a device which makes it possible to connect a sensor head both mechanically and, where applicable, electrically. Mechanical connection or separation is often effected as a result of magnetic forces or as a result of an automatically driven mechanical closure. Electrical connection is effected, as a rule, as a result of resilient contacts which also produce an electric connection in the mechanically connected state.

In addition, automatic changing interfaces for the mechanism are known with radio transmission for data communication. In this connection, the electronics provided in a sensor can be supplied by means of a battery or contacts on the carrier system with electric energy.

Manual changing interfaces for turn-swivel joints and sensor heads, which are fastened by means of a mechanical screwing or clamping mechanism, are known over and above this.

In this case, only the two first-mentioned methods are suitable for automatic changing. In the event of radio transmission, problems frequently arise in this case as the data cannot be transmitted along transmission paths reliably in real time and in the desired form. Examples of this, for example, are gigabit cameras as sensors where the required data amounts cannot be transmitted, or for example white light sensors which require a special optical wave guide as transmission medium.

Mechanical changing interfaces, over and above this, often comprise too few available lines through the carrier structure. The quality of such a line with reference to requirements such as CAT-5, CAT-6, CAT-7, the line cross section, the line length, the wave impedance and/or the damping can also be insufficient. Often required transmission paths are just not there and are not realizable in the existing mechanical surroundings, e.g. optical wave guides in the different required forms as mono-mode fibers or multi-mode fibers. The required different types of optical wave guides with their respective minimum bending radii and maximum coupling losses do not allow for integration in known turn-swivel joints or make it extremely difficult. On account of this, modern sensors with particular physical and/or technical data requirements are frequently only exchangeable on known changing interfaces of coordinate measuring machines in a manual manner.

Consequently, there is a need for a possibility of being able to change-in and operate in an automatic manner different modern sensor heads, both of an optical and tactile design, with corresponding physical and/or technical data requirements, in particular on existing changing interfaces of carrier structures of coordinate measuring machines without impairing the function of previous sensors and at the same time ensuring the previous measuring accuracy. Being able to recognize an individual changed-in sensor head as provided hitherto and being able to reproduce a corresponding changing interface with reference to the arrangement of the elements with respect to one another should also continue to be provided.

An object of the present invention is consequently to provide a correspondingly improved method, an improved sensor head, an improved carrier structure element, an improved magazine location and a correspondingly improved coordinate measuring machine.

SUMMARY OF THE INVENTION

According to one aspect of the invention, there is provided a method for automatically receiving a sensor head of a coordinate measuring machine, wherein the sensor head comprises a first changing interface for coupling the sensor head with a carrier structure of the coordinate measuring machine, and wherein the sensor head further comprises a second changing interface for coupling a cable element with the carrier structure, wherein the second changing interface of the sensor head is arranged on an end of the cable element distal to the sensor head, wherein the second changing interface of the sensor head is spatially separated from the first changing interface of the sensor head, and wherein the sensor head is prepared at the start in a magazine location of the coordinate measuring machine, wherein the sensor head is received with the first changing interface in a first receiver of the magazine location, wherein the second changing interface is received in a second receiver of the magazine location, with the following steps:

approaching the first receiver of the magazine location in which the first changing interface of the sensor head is received, coupling the carrier structure with the first changing interface of the sensor head, and removing the sensor head out of the first receiver of the magazine location, and approaching the second receiver of the magazine location in which the second changing interface of the second head is received, coupling the carrier structure with the second changing interface of the sensor head, removing the end of the cable element of the sensor head distal to the sensor head out of the second receiver of the magazine location.

According to a further aspect of the invention, a carrier structure element is provided, in particular a turn-swivel unit, for a coordinate measuring machine, said carrier structure having a first changing interface for coupling the carrier structure element with a first changing interface of a sensor head, and wherein a second changing interface for coupling the carrier structure element with a second changing interface on a cable element of the sensor head, wherein the second changing interface of the carrier structure element is spatially separated from the first changing interface of the carrier structure element.

According to a further aspect of the invention, a sensor head for a coordinate measuring machine is provided, said sensor head having a first changing interface for coupling the sensor head with a carrier structure of the coordinate measuring machine, and wherein the sensor head further comprises a cable element and a second changing interface for coupling the cable element with the carrier structure, wherein the second changing interface is arranged on an end of the cable element distal to the sensor head, and wherein the second changing interface is spatially separated from the first changing interface.

According to a further aspect of the invention, a magazine location for a coordinate measuring machine is provided, said magazine location having a first receiver for receiving a first changing interface of a sensor head, wherein the magazine location further comprises a second receiver for receiving a second changing interface of the sensor head, wherein the first receiver and the second receiver are spatially separated from one another, in particular offset in height.

According to a further aspect of the invention, a coordinate measuring machine is provided, said coordinate measuring machine having at least one element from a group consisting of the provided carrier structure element or one of its refinements, the provided sensor head or one of its refinements and the provided magazine location or one of its refinements.

Consequently, a multi-step changing system is proposed which, on the one hand, utilizes a first changing interface which can be developed according to a hitherto known design, and on the other hand, an additional second changing interface with correspondingly developed magazine locations which can be provided for additional transmission media, such as, for example, optical wave guide or special cable. As such a sensor head in the deposited state then comprises a loose cable connection as changing interface, it is possible, with a restricted travel, to disconnect or to connect both the first changing interface and the second changing interface of the cable element in a separate manner. This means that once the sensor head has been received by means of the first changing interface, by means of an identification system present in the sensor head, it can be determined whether it is a "normal" sensor change by means of simply a first changing interface or a multi-stage change which requires the connecting of a further cable connection to the second changing interface.

If such a multi-stage change is necessary, a corresponding further movement is realized bringing about the connecting or disconnecting of the second changing interface. In this case, care must be taken to ensure that a movement region of the coordinate measuring machine is able to be restricted by the cable element and also the movement path of the coordinate measuring machine has to be established in a precise manner as the cable element could otherwise be caught, for example, on a magazine location. As soon as the second changing interface is also closed, the sensor head can then be used as usual for measuring. The cable element should be dimensioned such that it is able to compensate for the turn-and-swivel movement of the carrier structure.

For example, it is possible in this way in a particularly advantageous manner also to redesign existing manual changing interfaces by using additional elements for an automatic change which can be installed in a cost-efficient manner and are easy to change. Consequently, it is possible to use different sensor heads, in particular even with very rare types of interfaces, for automatic changing without having to undertake significant changes to existing coordinate measuring machines.

Naturally, it is also possible to realize a multi-stage sensor change in one changing operation, i.e. one movement sequence, when the first and the second changing interfaces are designed such that both changing interfaces are able to be coupled directly and the corresponding elements removed out of a magazine location with one single movement. This provides the additional advantage that the length of time taken for the changing operation does not increase.

In one refinement of the method, it can be provided that first the step a) is carried out and then the step (b).

In this way, an existing movement operation is able to be utilized in order to couple the first changing interface of the sensor head with the first changing interface of the carrier structure and to remove the sensor head out of the corresponding magazine location. A second movement sequence can then be utilized for the purpose of coupling the additional second changing interface of the sensor head with the corresponding second changing interface of the carrier structure and of removing it out of the magazine location.

In a further refinement of the method, it can be provided that subsequent to the coupling of the carrier structure with the first changing interface of the sensor head, a step of reading an identification unit of the sensor head is conducted and, when by way of the identification unit it has been recognized that a second changing interface of the sensor head is present, the step b) is carried out.

In this way, a first changing interface of the sensor head can be coupled with the first changing interface of the carrier structure first of all and then it can be recognized whether another further second changing interface has to be connected between the sensor head and the carrier structure. If this is the case, a second movement operation can then be carried out.

In a further refinement of the method, it can be provided that the steps a) and b) are carried out simultaneously.

In this way, the length of time of the entire changing operation can be significantly shortened.

In one refinement of the carrier structure element, it can be provided that the first changing interface of the carrier structure element is aligned in a first spatial direction and the second changing interface of the carrier structure element is also aligned in the first spatial direction such that an entry direction and a coupling direction of the first changing interface and of the second changing interface are identical.

In this way, it is possible to approach and to couple the first changing interface and the second changing interface in one single movement operation. The entry direction and the coupling direction, in this case, can be identical, but this is not absolutely compulsory. The entry direction and the coupling direction can also be different from one another. As a result of the described refinement, however, it is possible in each case to connect and also to disconnect the two changing interfaces again at the same time by means of one single entry movement and one single coupling movement.

In a further refinement of the carrier structure element, it can be provided that the second changing interface of the carrier structure element is configured as a changing interface for an optical wave guide.

In this way, it is possible, in particular, to use optical sensor heads, for example a white light sensor, for which an optical wave guide connection is mandatory. Obviously, it is also possible to utilize the optical wave guide for data transmission, in particular also in combination with a tactile measuring sensor head.

In a further refinement of the sensor head, it can be provided that the cable element is an optical wave guide, and wherein the second changing interface of the sensor head is configured as a changing interface for an optical wave guide.

It is also possible in this way to change-in in particular optical sensors for which the presence of an optical wave guide connection is mandatory, for example white light sensors. Obviously, the optical wave guide connection is also suitable for data transmission, in particular also in combination with a tactile sensor head.

In a further refinement of the sensor head, it can be provided that the first changing interface of the sensor head is configured in such a manner that the sensor head is rotatable about a first rotational axis relative to the carrier structure of the coordinate measuring machine, and wherein an end of the cable element proximate to the sensor head is arranged coaxially with respect to the first rotational axis.

In particular when there is an optical wave guide which is coupled by means of the second changing interface, it can sometimes not be possible not to run the optical wave guide through the axes in a turn-swivel joint, for example an RDS® by the applicant, in the carrier structure on account of the required large bending radii. If, in such a case, the end proximate to the sensor head can be arranged on the sensor head such that it extends centrally or coaxially with respect to a rotational axis of the sensor head relative to the carrier structure, the cable element can be kept relatively short. In this case, it is simply necessary for the cable element, as a result of its length, to have to compensate for a rotational movement of a turn-swivel unit in relation to the rest of the carrier structure; a movement about the first rotational axis then provides pure torsion for the cable element.

In a further refinement of the sensor head, it can be provided that the second changing interface on the end of the cable element distal to the sensor head is configured as a collar portion which surrounds the cable element at least in part.

By means of such a collar portion, it is possible to couple an end of a cable element distal to the sensor head in a positionally accurate manner in a magazine location. For example, the collar portion can be realized in a panel-shaped manner and on its outer circumference comprise a shaping which is able to be inserted into a correspondingly complementarily realized groove of a receiver of a magazine location. In this way, the end of the cable element distal to the sensor head can be arranged in a positionally accurate and reproducible manner. Any possible bending stiffness of the cable element or its tension on account of previous bending or torsion of the cable element does not then bring about any change in the position or location of the cable element as it is fixed in a receiver of the magazine location on account of the collar portion.

In a further refinement of the sensor head, it can be provided that the sensor head comprises an identification unit in which information as to the presence of the first changing interface and of the second changing interface is stored.

In this way, it is possible when the first changing interface of the sensor head is coupled with a first changing interface of the carrier structure to read whether a second changing interface of the carrier structure is present and has to be coupled or disconnected. Said information can be filed directly in the identification unit or can also be produced indirectly, for example from a type of the sensor head or the like.

In a refinement of the magazine location, it can be provided that the first receiver and the second receiver are configured for receiving a respective changing interface from the same spatial direction.

In this way, it is also possible to deposit a sensor head with its first changing interface and a second changing interface in such a manner in the first receiver and the second receiver of the magazine location that the first changing interface and the second changing interface can be coupled and removed simultaneously by means of one single movement of a carrier structure.

It is obvious that the features mentioned above and those yet to be mentioned below are usable not only in the respectively provided combination but also in other combinations or standing on their own without departing from the framework of the present invention.

BRIEF DESCRIPTION OF THE DRAWINGS

Embodiments of the invention are shown in the drawing and are explained in more detail in the following description, in which:

FIG. 3 shows an isometric view of a part region of a coordinate measuring machine, FIG. 8 shows a further enlarged view of a detail of a second changing interface and FIG. 9 shows an isometric representation of a further embodiment of a sensor head and of a magazine location.

DETAILED DESCRIPTION OF THE PREFERRED EMBODIMENTS

Figure 1:
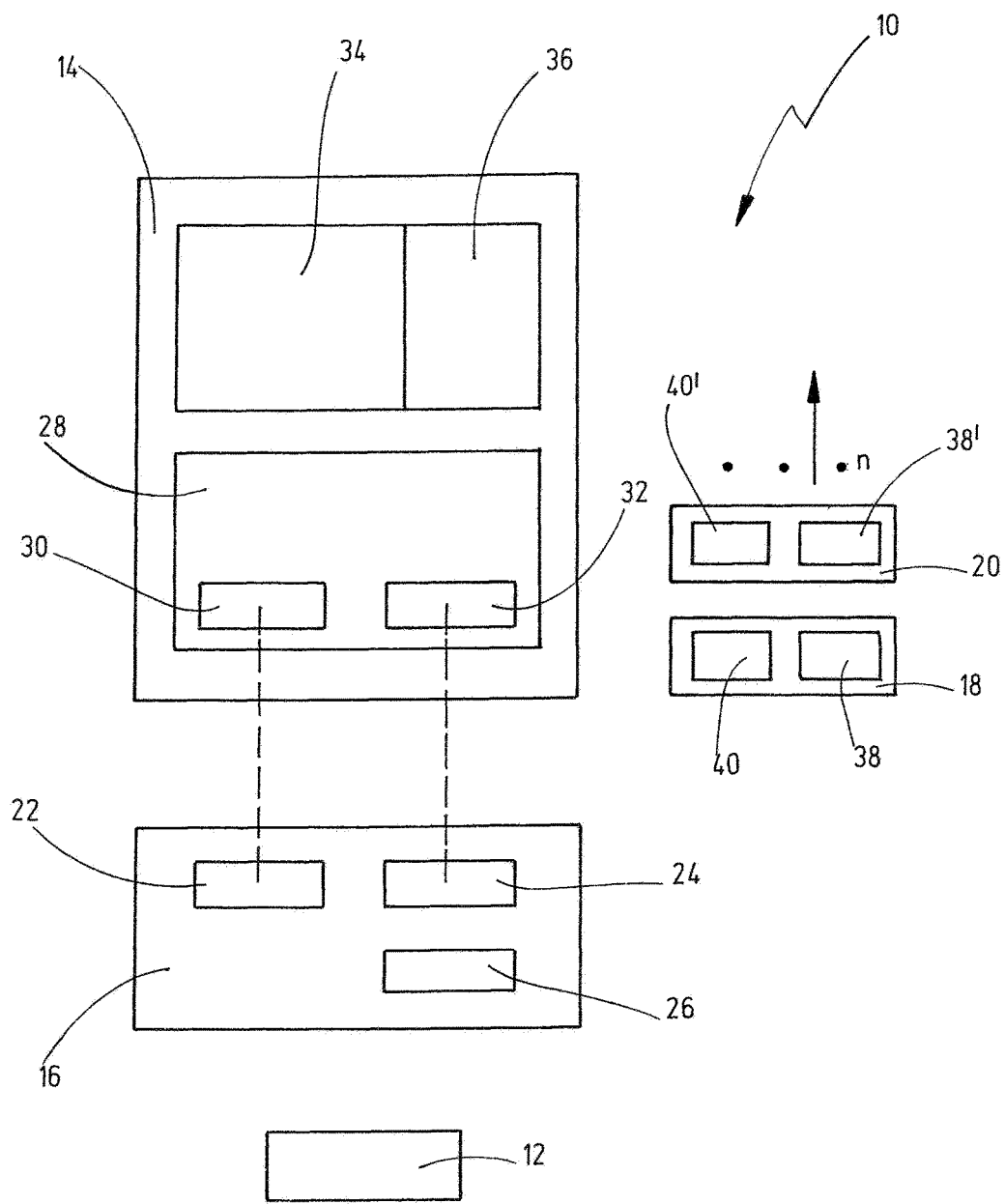
FIG. 1 shows a schematic representation of a coordinate measuring machine, a carrier structure, a sensor head and a magazine location according to the present invention.

FIG. 1 shows an embodiment of a coordinate measuring machine 10 for measuring a measurement object 12. The coordinate measuring machine 10 comprises a carrier structure 14 which can be designed in a manner known per se. For example, it can be a portal construction, a horizontal arm construction or any other suitable type of carrier structure 14. A sensor head 16, which can be a tactile sensor head or, however, also an optical sensor head or any other type of sensor, is connectable to the carrier structure 14. In addition, the coordinate measuring machine 10 comprises a first magazine location 18 in which a sensor head 16 can be deposited and stored. Over and above this, a second magazine location 20 for receiving a further sensor head 10 and even more magazine locations with corresponding sensor heads can be provided such that the coordinate measuring machine 10 is operable with several different sensor heads 16. An automatic changing operation makes it possible to change between the sensor heads 16.

At least one of the sensor heads 16 comprises a first changing interface 22 for this purpose. Said first changing interface 22 can be a changing interface according to a hitherto conventional design. This can be provided, for example, for the purpose of fastening the sensor head 16 on the carrier structure so as to be rotatable relative to said carrier structure. In this case, both electrical and mechanical connections can be provided in the first changing interface 22. Electric energy and/or data and/or light can thus be transmitted over the first changing interface. In addition, the sensor head 16 comprises a second changing interface. Said second changing interface 24 is, for example, a correspondingly developed cable element, as is explained in more detail below, which is, in particular, an optical wave guide. Said optical wave guide can serve for transmitting light or large data rates. In addition, the sensor head 16 can comprise an identification unit 26 which identifies a type of the sensor head 16 or, however, can clearly identify the sensor head 16. In this way, as a result of reading the identification unit 26, the presence of the first changing interface 22 and of the second changing interface 24 can be detected from the remaining components of the coordinate measuring machine 10.

In addition, the coordinate measuring machine 10 comprises a carrier structure element 28 of the carrier structure 14, with which the sensor head 16 is coupled, in particular rotatably coupled. The carrier structure element 28 can then be arranged, in turn, so as to be rotatable relative to the remaining carrier structure 34 such that the sensor head 16 is pivotable in total about two axes. An example of such a carrier structure element 28 is a turn-swivel unit such as, for example, is marketed by the applicant under the designation RDS®. The carrier structure element 28 comprises in a corresponding manner a first changing interface 30 which is couplable with the first changing interface 22 of the sensor head 16. In a corresponding manner, it also comprises a second changing interface 32 which is couplable with the second changing interface 24 of the sensor head 16.

In addition, the coordinate measuring machine 10 can comprise an evaluation unit 36 which can be incorporated in the carrier structure 14, but can also be realized separately from said carrier structure.

As has already been stated above, the coordinate measuring machine 10 comprises over and above this at least one first magazine location 18 and can comprise over and above this a second magazine location 20 and/or an arbitrary number of even more magazine locations. Each of the magazine locations 18, 20 comprises a first receiver 38 which is configured for receiving a first changing interface 22 of a respective sensor head 16 and a second receiver 40 which is configured for receiving on a corresponding second changing interface 24 of a sensor head 16. If sensor heads which simply comprise a first changing interface 22 are provided over and above these, obviously one or several magazine locations which just comprise one first receiver 38 can also be provided.

Figure 2:
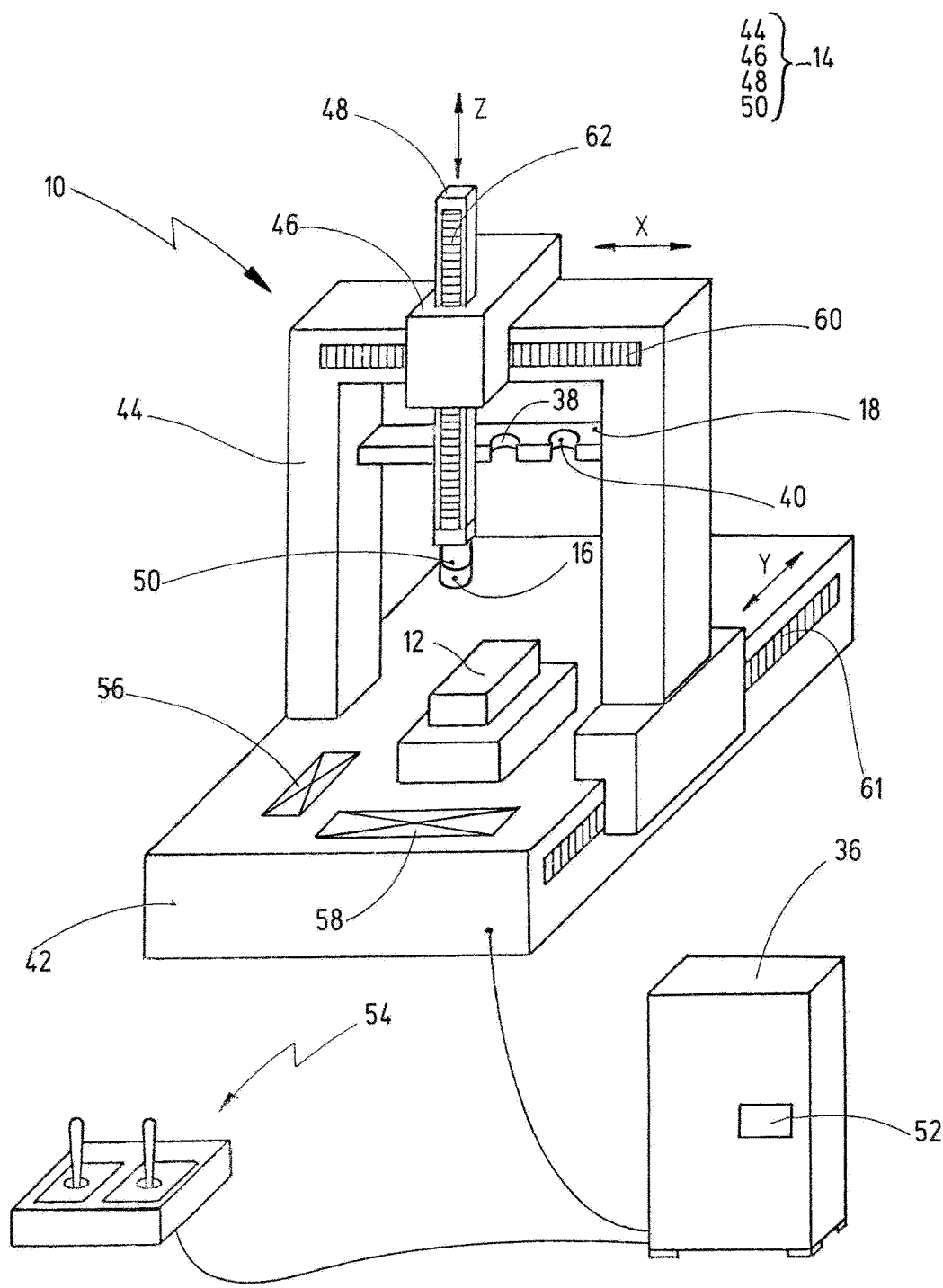
FIG. 2 shows an isometric view of a coordinate measuring machine.

FIG. 2 shows a schematic isometric view of a coordinate measuring machine 10. The coordinate measuring machine 10 comprises a carrier structure 14 in portal design. A portal 44, which is mounted so as to be movable in a Y direction along a base 42, is provided on the base 42. A carriage 46, which is movable in an X direction relative to the portal 44, is arranged in turn on the portal 44. A quill 48, which is arranged in a Z direction relative to the carriage 46, is arranged in turn in the carriage. A turn-swivel unit 50, on which, in turn, the sensor head 16 is arranged, can then be provided on the quill 48. The turn-swivel unit 50 is rotatable relative to the quill 48. The sensor head 16, in turn, is rotatable relative to the turn-swivel unit 50. On the rotational axis of the sensor head 16 relative to the turn-swivel unit 50, a so-called B axis, and a rotational axis of the turn-swivel unit 50 relative to the carrier structure 14, a so-called A axis, are perpendicular with respect to one another. In this way, it is consequently possible to arrange the sensor head 16 so as to be both translatory and rotatory in an arbitrary manner relative to the measurement object 12 in order to measure said measurement object. In the embodiment shown of a portal design, the portal 44, the carriage 46, the quill 48 and the turn-swivel unit 50 form the carrier structure 14.

The coordinate measuring machine 10 can additionally comprise the evaluation unit 36 which has already been mentioned above and can be arranged as a component part of the carrier structure 14 or of the base 42, but can also be arranged separately. In addition, an output unit 52 is provided and an input unit 54 is provided which can be configured as part of the evaluation unit 36 but can also be realized separately from it. The output unit 52 can be, for example, a monitor screen. The input unit 54 can also be, for example, a keyboard, a mouse or another suitable input unit.

In addition, the coordinate measuring machine 10 comprises at least the first magazine location 18 which comprises in the first receiver 38 and the second receiver 40. For reasons of simplicity, only the first magazine location 18 is shown in FIG. 2. Obviously, further magazine locations 20 can be provided over and above this. The magazine location 18 is fastened on the portal 44 in the embodiment shown. Over and above this, however, further installation sites for a magazine location 18 can also be chosen within a measuring region, as are indicated, for example, by means of the place holders 56 and 58. These are on the base 12 for example.

In addition, a coordinate measuring machine 10 comprises in the usual manner a scale in the X direction, a scale in the Y direction 61 and a scale in the Z direction 62 in order to be able to determine a position of the portal, of the carriage and of the quill in a clear manner and to control a movement of the sensor head 16.

FIG. 3 shows a schematized enlarged view of a detail which shows the new magazine location 18 together with a correspondingly adapted carrier structure element 28 and a correspondingly adapted sensor head 16. The sensor head 16 comprises a cable element 64 which is fastened with an end 70 proximate to the sensor on the sensor head 16. As is shown below in more detail, the end 70 proximate to the sensor is realized coaxially with respect to a first rotational axis 94 of the sensor head 16 relative to the carrier structure element 28. In the representation in FIG. 3, said first rotational axis 94 is shown by the dot-dash lines. Said first rotational axis 94 is produced when the sensor head 16 is rotatably coupled with the turn-swivel unit 50.

An end 72 of the cable element 64 distal to the sensor or sensor head, or sensor-head-remote end, comprises a collar portion 66. The detailed refinement of the collar portion 66 is explained again below. The collar portion 66 is configured for the purpose of being received in a second receiver 40 of the magazine location 18. The collar portion 66, in this case, is arranged non-rotatably in the second receiver such that torsion stress or bending stress of the cable element 64 is not able to bring about any change in its position and the orientation. In one of the refinements for example, the cable element 64 can be an optical wave guide or optical fiber or any other type of cable element.

The magazine location 18 comprises over and above this a first receiver 38 for the sensor head 16 in which the first changing interface 22 thereof is received. Said first receiver 38 is developed in a manner known per se with a corresponding roller hinge element 74 which serves to protect the first changing interface 22.

The turn-swivel unit 50 or the carrier structure element 28 with the carrier structure 14 is rotatable about a further rotational axis 96 relative to the carrier structure 14. The carrier structure element 28 comprises a first changing interface 30 by way of which it can be coupled out of the changing interface 22 of the sensor head 16. In addition, the carrier structure element 28 comprises a second changing interface 32 by way of which it can be coupled with the second changing interface of the sensor head 16. A cable continuation 68 leads from the second changing interface 32 for example to the evaluation unit 36 or to another element of the coordinate measuring machine 10. It can naturally also be provided in the external continuation shown that the cable continuation extends in the interior of the carrier structure 14.

As explained below as an example by way of FIGS. 4a to 4f, the sensor head 16 can be removed in an automatic manner out of the deposited position shown in FIG. 3 of said sensor head in the magazine location 18.

Figure 4A:
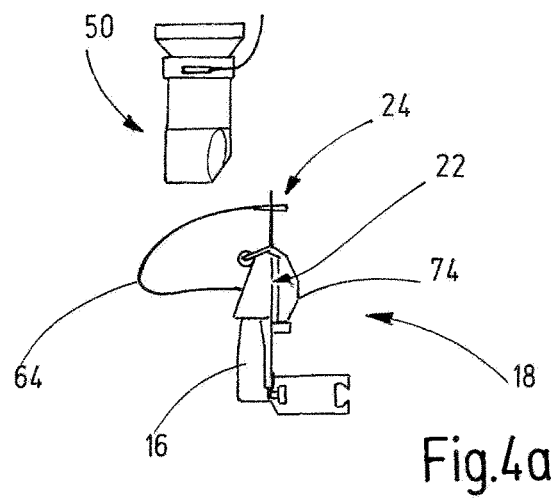
FIGS. 4a to 4f show a schematic representation of a movement sequence for connecting a first changing interface and a second changing interface.

FIG. 4a shows a starting position for receiving the sensor head 16 by means of the turn-swivel unit 50. The sensor head 16, as realized above in conjunction with FIG. 3, is received in the magazine location 18. In this case, a first changing interface 22 of the sensor head 16 is received in the first receiver 38 and the second changing interface 24 of the cable element 64 of the sensor head 16 is received in the second receiver 40 of the magazine location 18. The turn-swivel unit 50 also comprises a corresponding first changing interface 30 which has to be moved into contact with the first changing interface 22 of the sensor head 16. In a corresponding manner, the turn-swivel unit 50 comprises a second changing interface 32 which has to be moved into contact with the second changing interface 24 of the sensor head 16. In this case, the first changing interface 30 and the second changing interface 32 are aligned in the same spatial direction 88. The same applies to the first changing interface 22 and the second changing interface 24 of the sensor head. In a corresponding manner, the first receiver 38 and the second receiver 40 of the magazine location 18 are correspondingly aligned such that simultaneous coupling of the first changing interfaces 22, 30 and of the second changing interfaces 24, 32 is made possible.

Figure 4B:
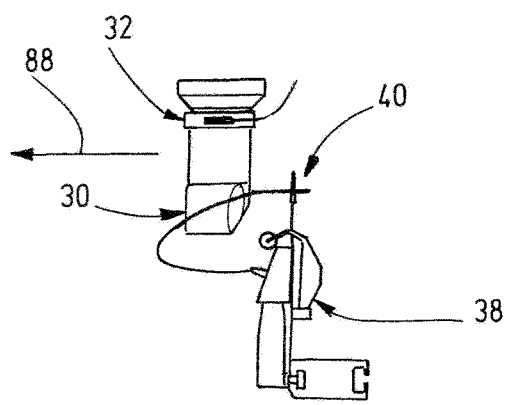
Figure 4C:
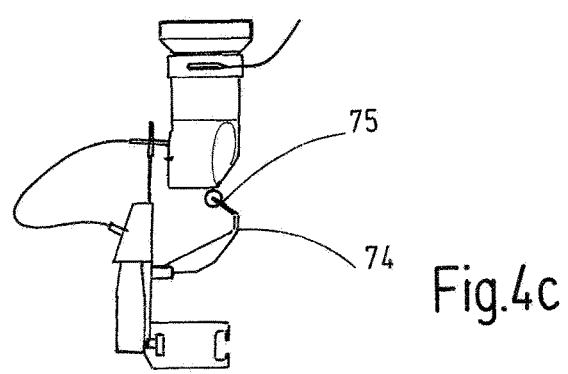
Figure 4D:
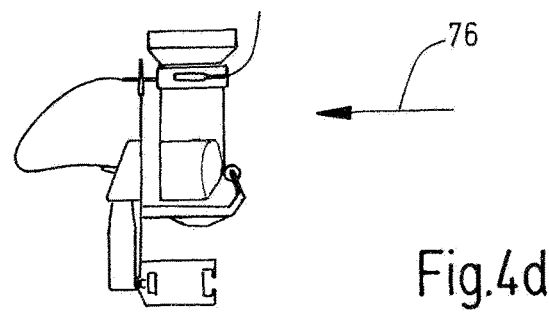
Figure 4E:
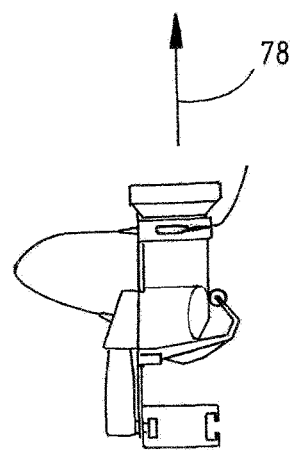
Figure 4F:
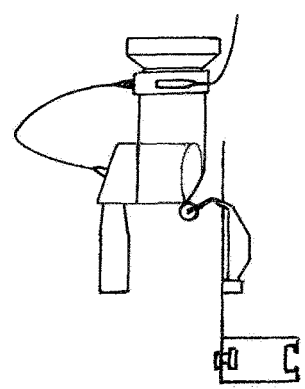

As can be seen from the transition from FIG. 4b to FIG. 4c, the turn-swivel unit 50 first of all moves closer to the roller hinge element 74 in order to release the first changing interface 22. Then it is possible for the turn-swivel unit 50 to move down along the roller 75 of the roller hinge element 74 in the position shown in FIG. 4d. An entry direction and coupling direction 76 coincide in the embodiment shown. It is consequently possible to move the turn-swivel unit 50 in the direction of the arrow marked with the reference 76 in FIG. 4d in order to couple both the first changing interface 22, 30 and the second changing interface 24, 32 at the same time in order to achieve the state shown in FIG. 4e. As a result of moving the turn-swivel unit 50 in the removal direction 78 shown in FIG. 4e, it is then possible to remove the coupled sensor head 16 out of the magazine location 18.

The sensor head 16 is then correspondingly deposited in the magazine location 18 in the reverse order, the roller hinge element 74 obviously having first of all to be moved to the open state once again.

Figure 5:
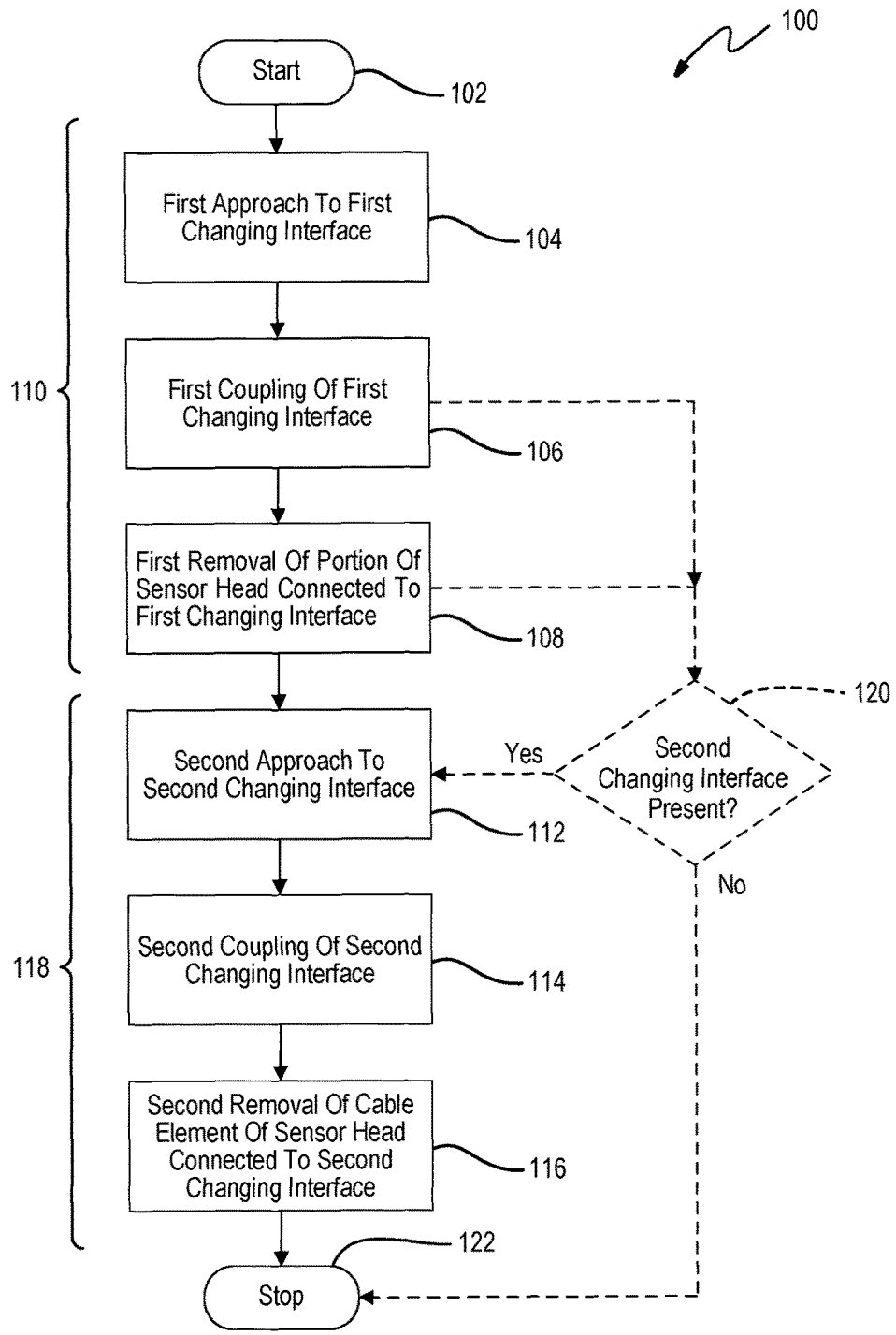
FIG. 5 shows a schematized flow diagram of an embodiment of a method.

FIG. 5 shows a schematic flow diagram of a method 100. The method starts with the step 102. As has already been explained above, a first approach 104 to a first changing interface 22 of the sensor head 16 which is deposited in the magazine location 18 is conducted first of all. Then a first coupling 106 of a first changing interface 30 of the carrier structure 14 to the first changing interface 22 of the sensor head 16 is conducted. A first removal 108 of the part portion of the sensor head 16 connected to the first changing interface 22 is then conducted. The steps 104, 106, 108 taken together can form a step a) which is designated with the reference 110. In addition, a second approach 112 to the second changing interface 24 of the sensor head 16 located in the second receiver 40 of the magazine location 18 can be conducted. In a step 114, a second changing interface 32 of the carrier structure element 28 would then be coupled with the second changing interface 24 of the sensor head. In step 116, the second changing interface 24 of the sensor head and the cable element 64 connected thereto are then removed out of the second receiver 40. The steps 112, 114, 116 taken together are designated as step b) with the reference 118. The step sequences 110 and 118 can be carried out in the sequence shown but also in a different sequence, i.e. first of all the step sequence 118 and then the step sequence 110. In addition, as is explained again below, it is possible for the step sequences 110 and 118 to be carried out simultaneously, as has also been described in conjunction with FIGS. 4a to 4f.

In addition, FIG. 5 shows a step 120 of reading an identification unit 26 of the sensor head 16. Said reading can be effected following the first approach 106. The reading 120 can therefore be effected directly after the step 106 but also not until after the step 108 of the removal out of the changing interface 22 of the sensor head 16. In the step 120, the identification unit 26 of the sensor head 16 is then read and it is determined in the coordinate measuring machine 10 whether a second changing interface 24 of the sensor head 16 is present. If this is the case, the step sequence 118 then follows, whereupon the method then ends in a stop step 122. If this is not the case, the method ends directly in the stop step 122.

Figure 6:
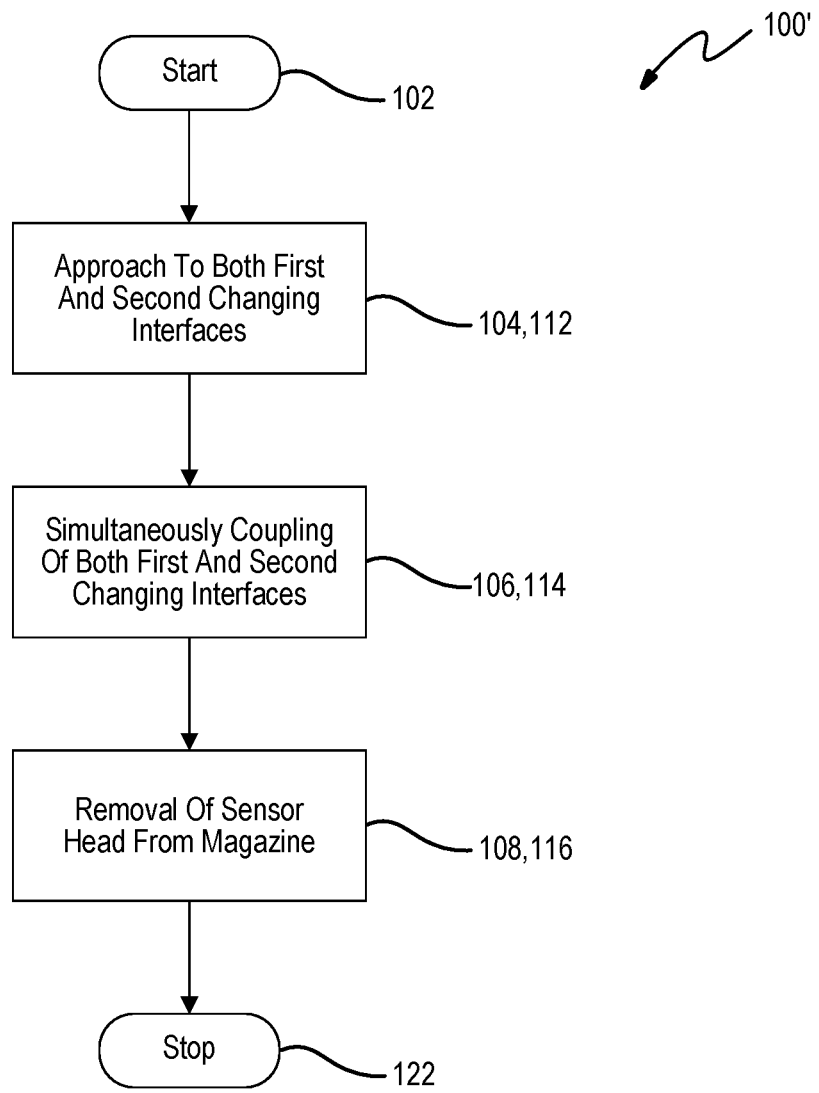
FIG. 6 shows a further schematized flow diagram of an embodiment of a method.

FIG. 6 shows an embodiment of the method 100' which serves for realizing the step sequence 110 and 118 simultaneously. This has also already been described in conjunction with FIGS. 4a to 4f.

A method of this type also starts in a step 102. The steps 104 and 112 are then carried out simultaneously, the carrier structure element 28 in the magazine location and the first and second changing interfaces 22, 24 of the sensor head 16 located in the first and second receiver 38, 40 being approached. The steps 106 and 114 of coupling the first changing interface 30 of the carrier structure element 28 with the first changing interface 22 of the sensor head 16 then take place simultaneously. In addition, the second changing interface 32 of the carrier structure element 28 is simultaneously coupled with the second changing interface 24 of the sensor head 16. The steps 108 and 116 are then carried out simultaneously and the sensor head 16 is removed out of the magazine location 18. The method then ends in a step 122.

It can be provided, in particular, that both the first 22, 30 and the second changing interfaces 24, 32 for receiving the sensor comprise a mechanical fixed assignment so that the receiving of the sensor head 16 can be effected in one go. However, an entry direction and a coupling direction of the individual changing interfaces 22, 24, 30, 32 have to be the same in direction and length for this purpose.

FIG. 7 shows once again an enlarged view of a detail of the region of the second changing interface 32 of the carrier structure element 28 and of the second changing interface 24 of the sensor head 16 which carries the cable element 64 with its collar portion 66. It can be seen that the collar portion 66 is realized in such a manner, for example is rectangular, that it can be inserted into the second receiver 40 and then can no longer be rotated. In this way, the end of the cable element 64 distal to the sensor is arranged non-rotatably and in a clear location and alignment such that coupling can take place. The second receiver 40 comprises, for example, a magnetic closing device 80 which holds the second changing interface 24 of the sensor head 16 securely in the receiver 40. Said fixed arrangement is able to be overcome and the second changing interface 24 "torn" out of the receiver 40 with a tensile force, the level of which is dependent on the magnetic force, provided by the turn-swivel joint 50.

Figure 7:
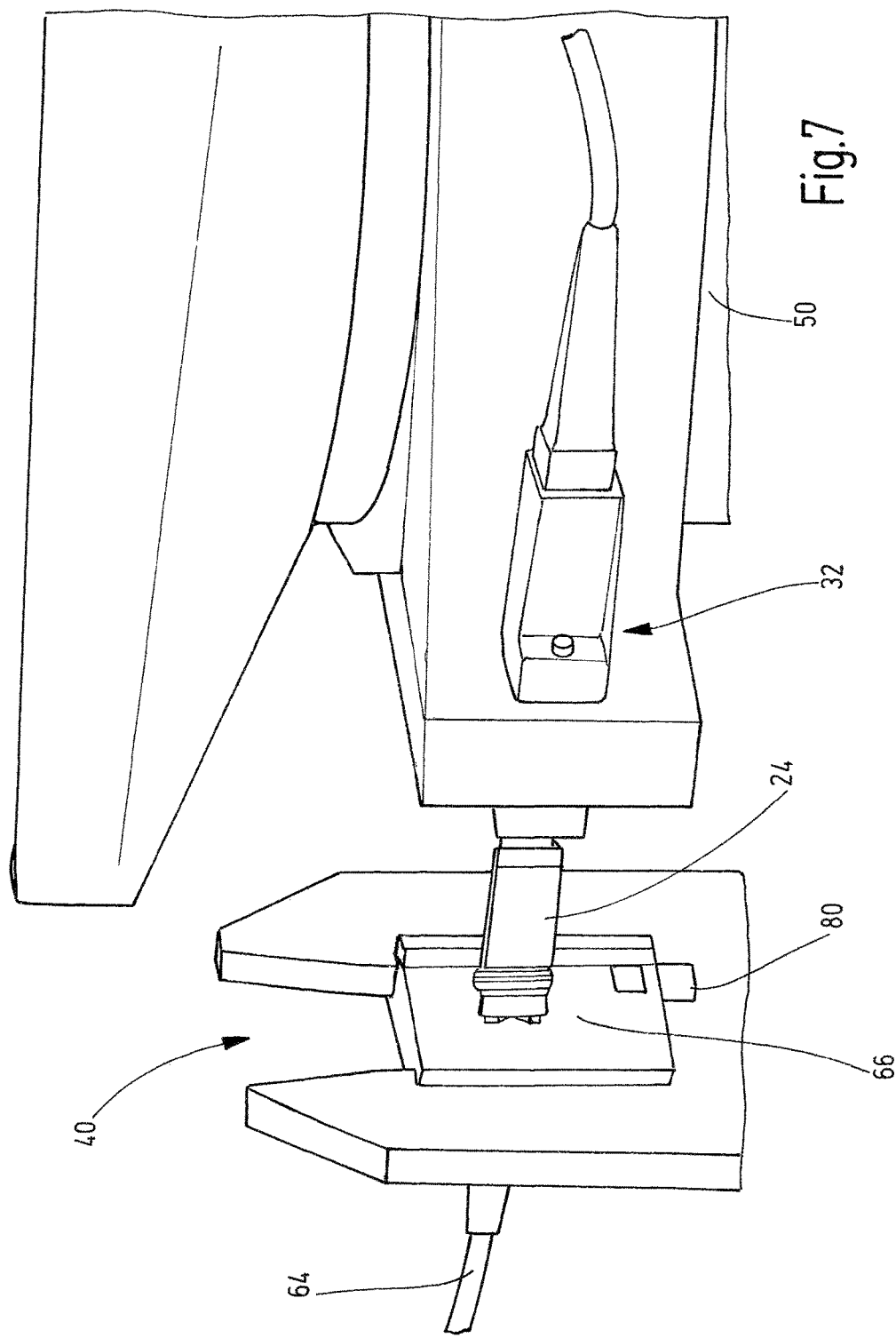
FIG. 7 shows an enlarged view of a detail of a second changing interface.

As shown in FIG. 7, the second changing interface 24 of the sensor head 16 and of the carrier structure 14 can be an E-2000 connector, as marketed by Diamond S.A., Switzerland. A CAT6 plug-in connector, for example, can be provided as an alternative to this.

Figure 8:
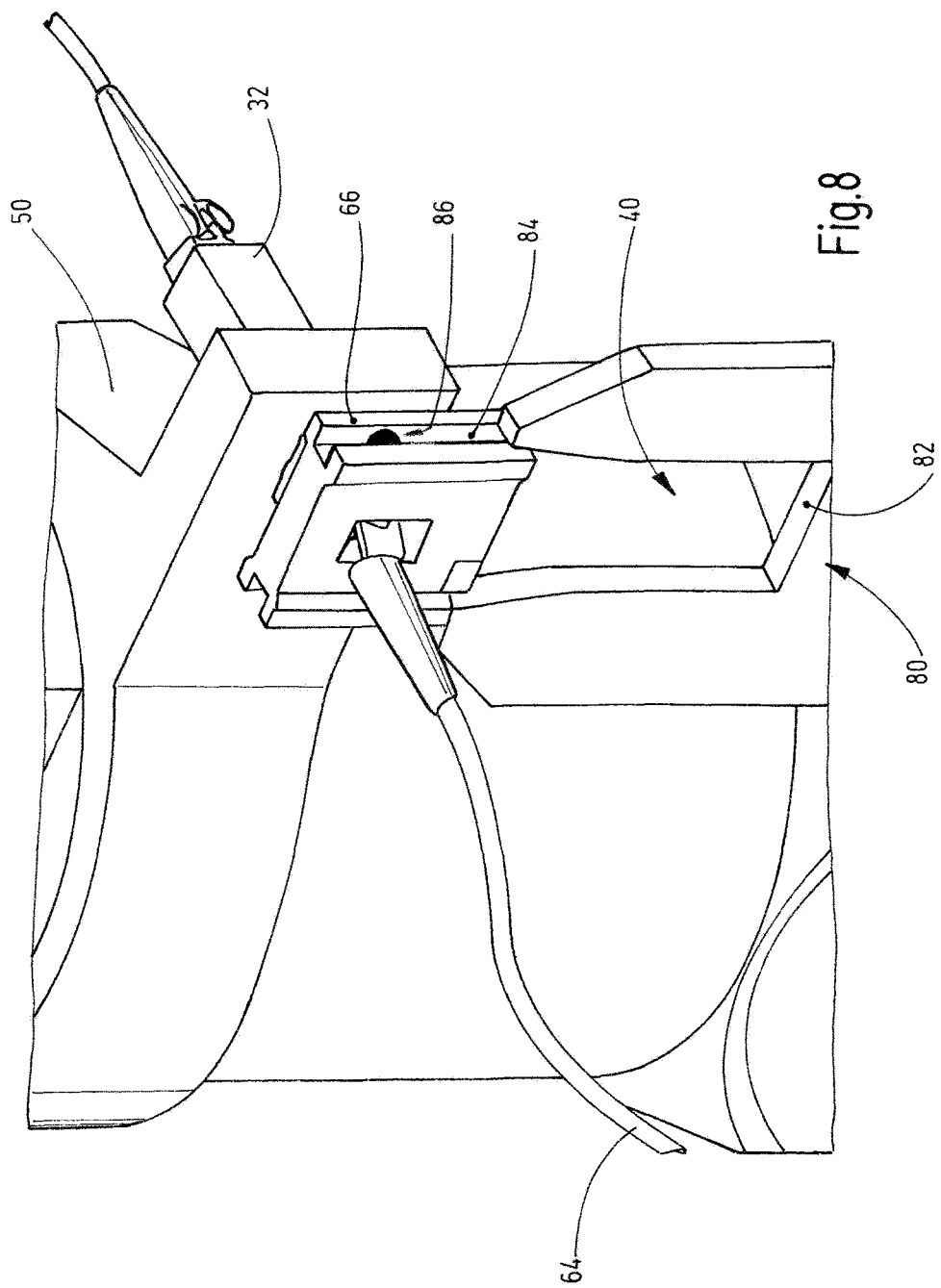

FIG. 8 shows the arrangement shown in FIG. 7 in a partially released state. The collar portion 66 comprises a groove which interacts with the receiver 40 as a tongue. The collar portion 66 can be pushed into the receiver 40 in this way. Orientation and position are thus fixed. A locking contact 86, which is actuated when the collar portion 66 is inserted into the receiver 40, is provided in a groove 84 of the collar portion 66. Mechanical locking of the second changing interfaces 24, 32, which are an E-2000 type connector or a CAT6 connector for example, is released in this way such that the corresponding cable connection is able to be disconnected.

FIG. 9 shows here yet another embodiment of a magazine location 18, a sensor head 16 and a carrier structure element 28. It can be noted here that a third changing interface 92 can definitely be arranged on the carrier structure 14 serving for providing a further cable connection 97. The changing interface 92 is configured as the second changing interface 32. In a corresponding manner, the magazine location also comprises a third receiver 90 which is formed corresponding to the second receiver 40 and serves for the purpose of receiving the third changing interface (not shown) as sensor head 16. In this way, a sensor head 16 can also be provided with several cable connections 64 which can all be connected to the carrier structure element 28 in one go.

It can consequently be provided that the carrier structure comprises more than one second changing interface. In a corresponding manner, it can also be provided that the sensor head 16 comprises more than one second changing interface 24. In a corresponding manner, it can also be provided that the magazine location 18, 20 comprises more than one second receiver 40. It can correspondingly be provided in the method 100 that the step sequence 18 or the step b) is carried out multiple times. In particular, the step sequence 118 can be carried out immediately until all the cable connections 64 are coupled. Obviously, it can also be provided here that coupling of all the second changing interfaces 24, 32 is conducted simultaneously.

Obviously, successive receiving can also be conducted here. Successive receiving can be advantageous in particular when, as a result of the mechanical design of the carrier structure element 28 and of the sensor head 16, it is not possible to carry out the changing operation in one go. This can be necessary, for example, when the type of the sensor head 16 or the movement necessary for coupling the corresponding first changing interfaces 22, 30 and the movement necessary for coupling the second changing interfaces 24, 32 are not mechanically compatible with one another.

What is claimed is:

1. A method for automatically receiving a sensor head of a coordinate measuring machine, wherein the sensor head comprises a first changing interface for coupling the sensor head with a carrier structure of the coordinate measuring machine, and wherein the sensor head further comprises a second changing interface for coupling a cable element with the carrier structure, wherein the second changing interface of the sensor head is arranged on an end of the cable element distal to the sensor head, wherein the second changing interface is configured as a collar portion which surrounds the cable element at least in part, wherein the second changing interface of the sensor head is spatially separated from the first changing interface of the sensor head, and wherein the sensor head is initially provided in a magazine location of the coordinate measuring machine, wherein the sensor head is received with the first changing interface in a first receiver of the magazine location, wherein the second changing interface is received in a second receiver of the magazine location, wherein the first receiver of the magazine location and the second receiver of the magazine location are spatially separated from one another; the method comprising the steps of:

a) approaching the first receiver of the magazine location in which the first changing interface of the sensor head is received, coupling the carrier structure with the first changing interface of the sensor head, and removing the sensor head out of the first receiver of the magazine location, and b) approaching the second receiver of the magazine location in which the second changing interface of the second head is received, coupling the carrier structure with the second changing interface of the sensor head, and removing the end of the cable element of the sensor head distal to the sensor head out of the second receiver of the magazine location.

2. The method according to claim 1, wherein the step a) is carried out first and then the step b).

3. The method according to claim 1, wherein subsequent to the coupling of the carrier structure with the first changing interface of the sensor head, a step of reading an identification unit of the sensor head is conducted and, when by way of the identification unit it has been recognized that a second changing interface of the sensor head is present, the step b) is carried out.

4. The method according to claim 1, wherein the steps a) and b) are carried out simultaneously.

5. The method according to claim 1, wherein the first changing interface includes both electrical and mechanical connections.

6. A method for automatically receiving a sensor head of a coordinate measuring machine, wherein the sensor head comprises a first changing interface for coupling the sensor head with a carrier structure of the coordinate measuring machine, and wherein the sensor head further comprises a second changing interface for coupling a cable element with the carrier structure, wherein the second changing interface of the sensor head is arranged on an end of the cable element distal to the sensor head, wherein the second changing interface of the sensor head is spatially separated from the first changing interface of the sensor head, and wherein the sensor head is provided at the start in a magazine location of the coordinate measuring machine, wherein the sensor head is received with the first changing interface in a first receiver of the magazine location, wherein the second changing interface is received in a second receiver of the magazine location, with the following steps:
- a) approaching the first receiver of the magazine location in which the first changing interface of the sensor head is received, coupling the carrier structure with the first changing interface of the sensor head, and removing the sensor head out of the first receiver of the magazine location, and
- b) approaching the second receiver of the magazine location in which the second changing interface of the second head is received, coupling the carrier structure with the second changing interface of the sensor head, removing the end of the cable element of the sensor head distal to the sensor head out of the second receiver of the magazine location;

wherein first the step a) is carried out and then the step b).

7. The method according to claim 6, wherein the first changing interface includes both electrical and mechanical connections.

8. A method for automatically receiving a sensor head of a coordinate measuring machine, wherein the sensor head comprises a first changing interface for coupling the sensor head with a carrier structure of the coordinate measuring machine, and wherein the sensor head further comprises a second changing interface for coupling a cable element with the carrier structure, wherein the second changing interface of the sensor head is arranged on an end of the cable element distal to the sensor head, wherein the second changing interface of the sensor head is spatially separated from the first changing interface of the sensor head, and wherein the sensor head is provided at the start in a magazine location of the coordinate measuring machine, wherein the sensor head is received with the first changing interface in a first receiver of the magazine location, wherein the second changing interface is received in a second receiver of the magazine location, with the following steps:
- a) approaching the first receiver of the magazine location in which the first changing interface of the sensor head is received, coupling the carrier structure with the first changing interface of the sensor head, and removing the sensor head out of the first receiver of the magazine location, and
- b) approaching the second receiver of the magazine location in which the second changing interface of the second head is received, coupling the carrier structure with the second changing interface of the sensor head, removing the end of the cable element of the sensor head distal to the sensor head out of the second receiver of the magazine location;

wherein subsequent to the coupling of the carrier structure with the first changing interface of the sensor head, a step of reading an identification unit of the sensor head is conducted and, when by way of the identification unit it has been recognized that a second changing interface of the sensor head is present, the step b) is carried out.

9. The method according to claim 8, wherein the first changing interface includes both electrical and mechanical connections.

\* \* \* \* \*